(12) United States Patent
Beaulieu

(10) Patent No.: US 6,337,203 B1
(45) Date of Patent: Jan. 8, 2002

(54) ODOR-FREE COMPOSTING METHOD AND INSTALLATION

(75) Inventor: Gilles Beaulieu, Beloeil (CA)

(73) Assignee: Groupe Conporec, Inc., Tracy (CA)

(*) Notice: Subject to any disclaimer, the term of this patent is extended or adjusted under 35 U.S.C. 154(b) by 0 days.

(21) Appl. No.: 09/055,672

(22) Filed: Apr. 7, 1998

(30) Foreign Application Priority Data

Dec. 31, 1997 (CA) ............................................. 2226022

(51) Int. Cl.$^7$ ........................... B09B 3/00; C12M 1/00; C05F 11/08

(52) U.S. Cl. ........................ 435/262.5; 71/9; 210/620; 435/290.1; 435/290.4

(58) Field of Search ................... 71/8, 9, 14; 435/819, 435/290.1, 290.4, 262.5; 210/620

(56) References Cited

U.S. PATENT DOCUMENTS

| | | | |
|---|---|---|---|
| 4,288,241 A | * 9/1981 | Shelef | 71/9 |
| 4,321,141 A | 3/1982 | Messing | 210/603 |
| 4,934,285 A | 6/1990 | Jormanainen et al. | 110/346 |
| 4,952,230 A | 8/1990 | Nordlund | |
| 5,082,475 A | * 1/1992 | Bentz | 55/68 |
| 5,181,950 A | * 1/1993 | Kneer | 71/9 |
| 5,356,452 A | * 10/1994 | Fahey | 71/10 |
| 5,387,036 A | * 2/1995 | Hagen et al. | 366/346 |
| 5,413,936 A | 5/1995 | Rupert | |

(List continued on next page.)

FOREIGN PATENT DOCUMENTS

| | | |
|---|---|---|
| DE | 44 06 363 A1 | 8/1995 |
| EP | 0 008 601 B1 | 8/1982 |
| EP | 0 179 045 A2 | 4/1986 |
| EP | 0 275 347 A1 | 7/1988 |
| EP | 0 164 384 B1 | 4/1989 |
| EP | 0 458 136 A3 | 11/1991 |
| EP | 0 613 711 A1 | 9/1994 |
| EP | 0 623 572 A1 | 11/1994 |
| EP | 0 655 427 A2 | 5/1995 |
| EP | 0 728 718 A1 | 8/1996 |
| JP | 60187397 | * 9/1985 ............ 71/9 |
| WO | WO 85/02172 | 5/1985 |
| WO | WO 90/00162 | 1/1990 |
| WO | WO 90/13527 | 11/1990 |
| WO | WO 92/18611 | 10/1992 |
| WO | 9427931 | * 8/1994 ............ 71/9 |
| WO | WO 95/10596 | 4/1995 |

OTHER PUBLICATIONS

"The compost story: From soil enrichment to pollution remediation" BioCycle, Garland et al., Journal of Composting & Recycling, Oct. 1995, pp. 1–5.

"1.4 Les avantages du Compostage" p. 18, with English translation.

Knauf, Susanne, "Forced Aeration by Suction of Air", p75–77, Nov. 1996.*

Primary Examiner—Wayne Langel
(74) Attorney, Agent, or Firm—Oblon, Spivak, McClelland, Maier & Neustadt, P.C.

(57) ABSTRACT

Raw waste is first composted into a bioreactor to produce a crude compost. At the outlet of the bioreactor, the crude compost is separated from the non-compostable waste fraction. Then, the separated crude compost is conveyed to a compost maturation area where the crude compost is recycled. The composting process is conducted in at least one closed building area maintained at a negative pressure for aspirating and directing odorous substances to a biofilter. This biofilter extracts the odorous substances whereby the process can carried out in urban areas without affecting the air quality and accordingly without disturbing the neighbourhood. Also, the composting process can be run with a number of employees as small as three, to produce high quality compost substantially free of pathogenic microorganisms.

21 Claims, 2 Drawing Sheets

U.S. PATENT DOCUMENTS

| | | | |
|---|---|---|---|
| 5,441,552 A | 8/1995 | DeLillo | 71/9 |
| 5,457,031 A | 10/1995 | Masse | 435/41 |
| 5,459,071 A * | 10/1995 | Finn | 366/345 |
| 5,465,847 A | 11/1995 | Gilmore | 209/12.1 |
| 5,518,922 A | 5/1996 | Sudrabin | 435/290.1 |
| 5,522,913 A | 6/1996 | Peguy | 71/9 |
| 5,556,445 A | 9/1996 | Quinn et al. | 71/11 |
| 5,599,713 A | 2/1997 | Sato | |
| 5,635,394 A | 6/1997 | Horn | |
| 5,650,070 A | 7/1997 | Pollock | 210/612 |

* cited by examiner

ODOR-FREE COMPOSTING METHOD AND INSTALLATION

BACKGROUND OF THE INVENTION

1. Field of the Invention

The present invention relates to a process and installation for composting waste material comprising organic matter, in particular but not exclusively municipal waste including household, commercial and industrial waste. The process and installation according to the instant invention also provides for sorting the non-organic recyclables present in the household, commercial and industrial waste.

2. Brief Description of the Prior Art

With the increase in urbanization and the advancement of the consuming society there has been a rapid increase in waste. The traditional way of disposing of this waste has been dumping it into landfill sites. Since most of the landfill sites are not sufficiently secure to prevent contamination of ground water and pollution of air by landfill produced methane, landfill sites have become an environmental concern of the consuming society. In this respect, many prior art patents are directed toward methods of handling waste, particularly municipal waste with the purpose of reducing the amount of total waste targeted for landfill sites.

Conventionally, the first step of processing waste is to separate the compostable fraction of the waste from the non-compostable fraction.

U.S. Pat. No. 5,522,913 (Peguy) issued on Jun. 4, 1996, U.S. Pat. No. 5,441,552 (DeLillo) issued on Aug. 15, 1995 and U.S. Pat. No. 4,934,285 (Jormanainen) issued on Jun. 19, 1990 teach of sorting non-compostable material for recycling prior to subjecting the compostable waste fraction to composting. In International patent application WO 90/00162 (Stenroos et al.) published on Jan. 11, 1990, an apparatus for composting organic waste is described but it appears that the compostable fraction has already been separated from the non-compostable waste fraction.

In U.S. Pat. No. 5,556,445 granted to Mark K. Quinn et al., on Sep. 17, 1996 municipal waste is first heated to between 212° F. and 500° F. with steam. Then, compostable and non-compostable waste fractions are separated for additional treatment such as composting and recycling.

In U.S. Pat. No. 5,522,913, U.S. Pat. No. 5,441,552, U.S. Pat. No. 4,934,285, and International patent application WO 90/00162, the prior art is silent as to the safety of individuals handling the raw waste while sorting the compostable waste fraction from the non-compostable fraction. As well, there is a requirement of time and labour to accomplish this first step. In U.S. Pat. No. 5,556,445, the waste is sterilized by heat and steam making it safe for handling but the process of feeding the waste into the chamber is not continuous and the energy requirement render this process costly and inefficient.

Also, the prior art composting processes and installations usually produce unpleasant odors disturbing the neighbourhood.

OBJECTS OF THE INVENTION

An object of the present invention is therefore to eliminate the drawbacks of the prior art.

Another object of the present invention is to provide safe, economical, efficient and odor-free process and installation for transforming waste into usable products.

A further object of the present invention is to provide a waste composting process and installation capable of minimizing the waste fraction directed to landfill sites, and to reduce the toxicity of the waste fraction targeted for landfill sites by converting the organic matter present in the waste into compost.

SUMMARY OF THE INVENTION

More specifically, in accordance with the present invention, there is provided a process for composting waste containing organic matter, comprising the steps of feeding the waste to a bioreactor enclosed in a first closed building area, composting the organic matter in the bioreactor to produce a crude compost, maturing the crude compost in a second closed building area to produce a refined compost, creating a negative pressure in the first and second closed building areas by pumping air containing odorous substances from these first and second closed building areas, supplying the air containing odorous substances and pumped from the first and second building areas to a biofilter, extracting, by means of the biofilter, the odorous substances to produce substantially odor-free air, and releasing the substantially odor-free air to the atmosphere.

The present invention also relates to an installation for composting waste containing organic matter, comprising (a) a first closed building area, (b) a bioreactor for composting the organic matter to thereby produce a crude compost, the bioreactor being enclosed in the first building area, (c) means for feeding the waste to the bioreactor, (d) a second closed building area for maturing the crude compost to thereby produce a refined compost, (d) means for conveying the crude compost from the bioreactor to the second building area, (e) means for pumping air containing odorous substances from the first and second building areas to create a negative pressure in these first and second building areas, and (f) a biofilter supplied by the air pumped by the air pumping means and containing odorous substances, for extracting these odorous substances and for releasing substantially odor-free air to the atmosphere.

Since a negative pressure is maintained in the closed building areas, and the odorous substances are extracted from the pumped air by the biofilter, the process and installation according to the present invention produce compost without producing odors susceptible of affecting and disturbing the neighbourhood.

In accordance with a first preferred embodiment of the present invention, the air containing odorous substances and pumped from the first building area is first supplied to the second building area, and the air containing odorous substances and pumped from the second building area is supplied to the biofilter. More specifically, in accordance with the first preferred embodiment, the air containing odorous substances and pumped from the first building area is injected in the compost maturing in the second building area.

According to another preferred embodiment of the present invention:
- the waste includes an organic compostable waste fraction formed by the above mentioned organic matter and a non-compostable waste fraction;
- the bioreactor is supplied with both the organic compostable waste fraction and the non-compostable waste fraction;
- the crude compost from the bioreactor is separated from the non-compostable waste fraction;
- the installation further comprises a third closed waste receiving building area for receiving raw waste, a fourth closed building area in which recyclable material is sorted from the separated non-compostable waste fraction, a fifth closed building area in which the refined compost from the second building area is secondary refined, and a sixth closed building area in which the secondary refined compost is stored; and a negative pressure is created in the third, fourth, fifth and sixth building areas by pumping air containing odorous substances from these third, fourth, fifth and sixth building areas, the air containing odorous substances and pumped from at least one of the first, third, fourth, fifth and sixth building areas is supplied to the second building area for example by injecting the pumped air in the compost maturing in the second building area, and the air containing odorous substances and pumped from the second building area is supplied to the biofilter.

The present invention further relates to a biofilter structure for extracting from air odorous substances produced by composting the organic matter, comprising a rock bed base, a network of perforated lines running into the rock bed base to inject in the biofilter the air containing the odorous substances, and a bed of filtering medium disposed on the top of the rock bed base for extracting the odorous substances from the air, this filtering medium consisting of an homogeneous mixture of wood chips, bark particles and organic material maintained at a predetermined degree of humidity.

Preferably, the organic material of the filtering medium is selected from the group consisting of compost, peat moss and a combination thereof.

The volumetric proportions of the filtering medium are as follows:

| | |
|---|---|
| wood chips | 4 ± 20% |
| bark particles | 4 ± 20% |
| organic matter | 1 ± 20% |

Finally, the predetermined degree of humidity is preferably located between 40% and 60%.

The objects, advantages and other features of the present invention will become more apparent upon reading of the following non restrictive description of a preferred embodiment thereof, given by way of example only with reference to the accompanying drawings.

DETAILED DESCRIPTION OF THE PREFERRED EMBODIMENT

Figure 1:
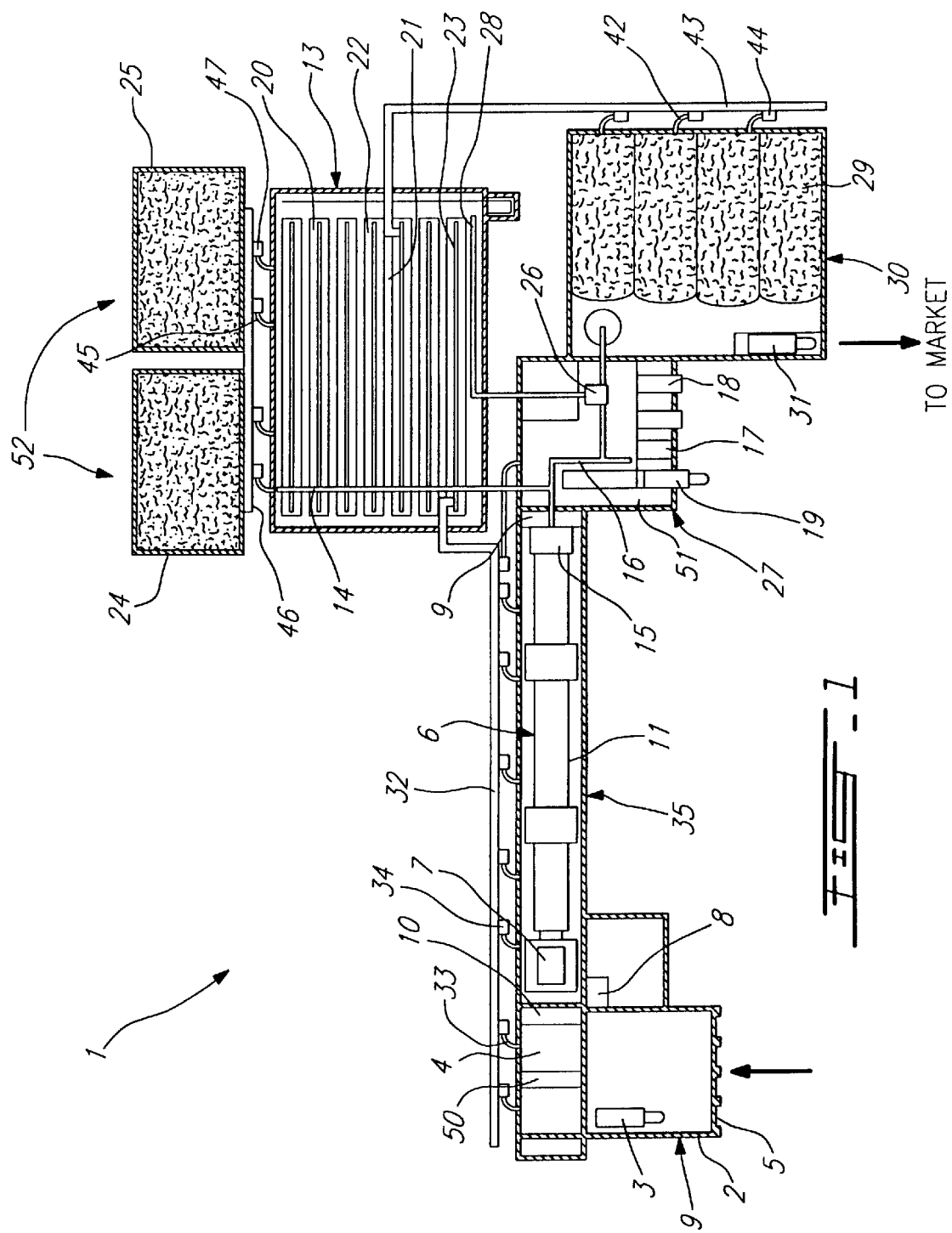
FIG. 1 is a plan view of an installation according to the invention for composting the organic fraction of waste.

Referring to FIG. 1 of the appended drawings, the waste composting installation, generally identified by the reference 1, comprises a large, fully enclosed waste receiving section 2 for receiving the trucks such as 3 transporting, for example, municipal waste. The large, fully enclosed waste receiving section 2 is located in a building area 9.

The fully enclosed waste receiving section 2 comprises a large pit 4. The building area 9 is normally closed; the doors such as 5 are opened only when trucks such as 3 enter the section 2 to unload in the pit 4 the waste they transport, and when the trucks subsequently leave the section 2 after unloading thereof. If desired, the raw waste arriving at the composting facility is weighted before unloading that raw waste in the indoor pit 4. Solid raw waste is then lifted from the pit 4 by an overhead crane and grapple assembly schematically shown at 50 in FIG. 1, and fed to a bioreactor 6 through a hopper 7. Bioreactor 6 is located in a building area 35.

Since the overhead crane and grapple assembly 50 is operated from a central control room 8 shown in FIG. 1, there is no direct contact between the workers and the raw waste in the indoor pit 4. Of course the pit 4, the overhead crane and grapple assembly 50 as well as the hopper 7 are in the field of vision of the operator, either directly or though video cameras and monitors, to enable feeding of the bioreactor 6 by means of the overhead crane and grapple assembly 50 through the hopper 7. The pit 4 can be divided into sections each receiving different types of solid waste to enable selective feeding of the bioreactor 6. This selective feeding can also be conducted through visual inspection by the operator of the waste contained into pit 4. Selective feeding will enable diversification of the types of waste supplied to the bioreactor 6 for optimal operation of this bioreactor.

As the waste is supplied to the bioreactor 6 as such, i.e. without preliminary treatment, the hopper 7 must be designed to prevent clogging. Since it is within the skill of an expert in the art to design an anti-clogging feeding hopper, hopper 7 will not be further described in the present specification.

Organic liquid waste is unloaded into a liquid storage tank 10. It is gradually pumped into the bioreactor 6 as process liquid, preferably including water.

Figure 2:
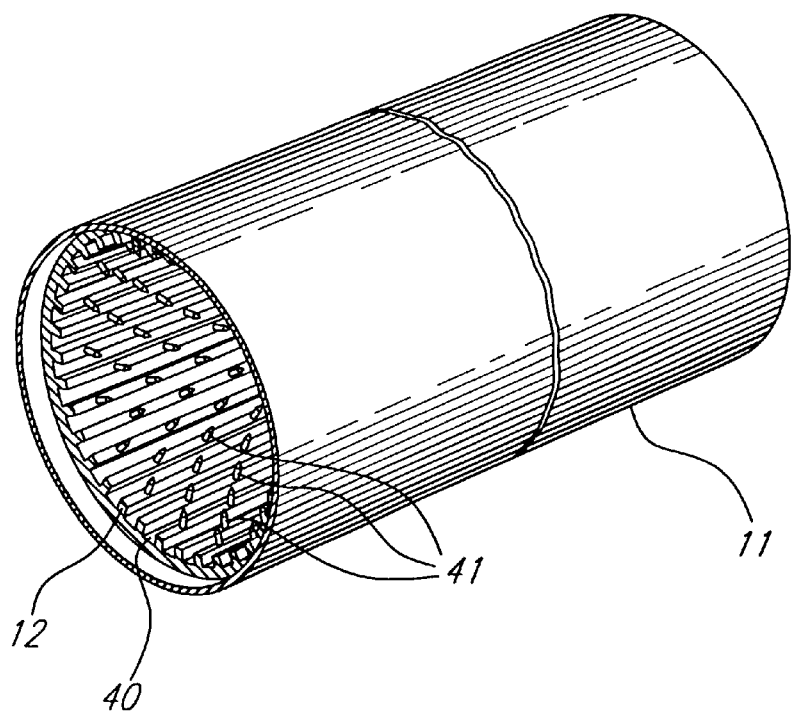
FIG. 2 is a perspective view showing the inside cylindrical surface of a bioreactor.

In the preferred embodiment, the bioreactor 6 consists of a horizontal, elongated cylinder 11 (FIGS. 1 and 2) 157 feet long and having a 14-foot interior diameter. It should be kept in mind that the length and diameter of the cylinder 11 can widely vary in relation to the waste composting capacity and other requirements of the intended application. Cylinder 11 is rotated in any direction about its longitudinal axis at a constant speed that can vary from ½ to 2 rpm (revolutions per minute). The inside of the cylinder 11 is covered by a corrugated lining 12. In the non limitative example of FIG. 2, the inner surface of the lining 12 defines a series of longitudinal grooves such as 40 having a generally rectangular cross section. Between the grooves 40 are also provided picks such as 41 to help in tearing plastic bags and break down larger particles. In operation, the rectangular grooves 40 are full of compost comprising microorganisms transferred to the waste fed into the cylinder 11 through the hopper 7 to promote composting. Of course, the inner lining 12 protects the inner surface of the cylinder 11 against abrasion. When the grooves 40 are filled with compost, the inner lining 12 also constitutes a thermal and sound insulation.

The hopper 7 is mounted at one end of the cylinder 11 of the bioreactor 6, whereby the raw waste is supplied to that end of the cylinder 11. Rotation of the cylinder 11 imparts movement to the waste from the said one end of the cylinder 11 to the opposite end of that cylinder 11, while continuously mixing that waste. The time of residence of the waste in the cylinder 11 of the bioreactor 6 is at least some days. It should be kept in mind that the time of residence of the waste in the rotating cylinder 11 must be sufficiently long to allow the temperature in that cylinder to reach a value sufficiently high (from 55° C. to 65° C. as indicated in the following description) to pasteurize the organic compostable waste portion. Therefore, during winter, a longer time of residence will be required to raise the temperature to the required value because of the colder temperature. Also, the time of residence must be sufficiently long to enable transformation of the organic compostable waste fraction into compost. The bioreactor 6 is capable of receiving 100 tons of waste daily (this capacity of the bioreactor 6 corresponds to the above mentioned dimensions and rotational speed of the cylinder 11).

The longitudinal corrugations formed by the grooves 40 on the inner surface of the lining 12 of the cylinder 11 dilacerate the waste without grinding the same, to more rapidly break down and reduce the organic compostable fraction of the waste. Inside the bioreactor 6, the waste is not only continuously mixed but also humidified and oxygenated to create in the bioreactor 6 optimal conditions for the growth and metabolic activity of desired miroorganisms. Oxygenation is carried out by simply pumping an optimum volume of air inside the bioreactor 6 to improve growth and metabolic activity of aerobic microorganisms. Moistening of the waste is made by adding liquid, preferably containing water into the bioreactor 6. More specifically, moistening is carried out by adding into the bioreactor 6 liquid waste. Leachate and wastewater from the yard of the composting facility are re-used in the composting process to moisten the waste in the bioreactor 6. However, since the quantity of liquid required is greater than the quantity of leachate and wastewater available from the yard, the composting process according to the present invention also enables processing of a variety of liquid waste such as sludge and out-of-date juice stocked into the tank 10.

As indicated in the foregoing description, in operation, the grooves 40 fill with compost which provides an ideal and enriched culture medium for the desirable microorganisms contained therein. The compost in the grooves 40 acts as a reservoir for useful microorganisms; these microorganisms are therefore always available to compost raw waste upon introduction of the raw waste into the bioreactor 6.

This ideal and enriched growth environment present in the bioreactor 6 results in an increased microbial metabolic activity and growth which produces an accelerated rate of composting. This accelerated rate of microbial composting activity generates heat to rapidly raise the temperature within the bioreactor 6 to a value situated between 55° C. and 65° C., this temperature level being maintained during the breakdown of the raw waste to crude compost i.e. for the whole duration of residence of the waste in the bioreactor 6. It should be mentioned here that this temperature level (between 55° C. and 65° C.) is higher than the germination lethal temperature.

The cylindrical shape of the bioreactor 6, and the continuous rotation of the cylinder 11 prevent the formation of empty zones following composting or loss of liquid; in static reactors, the flow of air is forced through these empty zones whereby these empty zones cool and the flow of air no longer supply the oxygen required by composting. Furthermore, continuous mixing of the waste in the bioreactor 6 produces a mixture of partially biodegraded organic matter (crude compost) and non-compostable residues, in which the crude compost is homogeneous.

The crude compost from the bioreactor 6 is separated from the non-compostable waste fraction and is conveyed to a compost maturation building area 13 through, for example, a conveyor belt 14. Since the non-compostable waste fraction has not been crushed or grinded, it can be easily separated from the crude compost by conventional systems or methods. In accordance with a preferred embodiment, this separation is conducted at the end of the rotating cylinder 11 opposite to the hopper 7 by means of a rotary trommel screen schematically shown at 15 having a 15–30 mm mesh. The mesh size may widely vary for example in relation to regulations in force in the country, province or state in which the composting facility is situated, in relation to client's requirements, in relation to the intended use of the compost, etc. The rotary trommel screen 15 is supplied with material from the corresponding end of the cylinder 11. The compost is allowed to pass through the rotary trommel screen 15 and is then gathered and conveyed to the compost maturation building 13 through the conveyor belt 14.

The non-compostable fraction of the waste which does not pass through the rotary trommel screen 15 is supplied to and runs on a conveyor belt 16 through a sorting section 17 located in building area 27 and where wood, stones, bricks, ferrous and nonferrous metals are pulled out and placed in different containers such as 18. A magnet (not shown) can be used to pick up tin cans which are then stock piled in the yard, shredded, cleaned and sold to steel mills. Materials which presently are not recycled, such as plastic films and foreign matter, are packed into a container such as 18 before being transported toward a landfill site.

Compostable material, such as dry sludge, may require no preliminary composting in the bioreactor 6. Such compostable material is received at a dry sludge receiving area 51 (see also truck 19) and is conveyed from area 51 to the compost maturation building area 13 for example through conveyor belts.

Separating the non-compostable waste fraction after the accelerated composting step has been performed by the bioreactor 6 comprises, amongst others, the following advantages:

the non-organic and non-compostable waste fraction is very clean and easily separate from the crude compost;

hygienization and stabilization of the totality of the products present in the waste received at the composting facility by the raise of temperature in the bioreactor; and all the material of the waste that is compostable is composted to maximize the fraction of the waste that is composted and thereby minimize the fraction of the waste that is transported to the landfill site.

After hygienization, handling of the non-compostable waste fraction at the sorting section 17 presents substantially no health hazard for the workers. This is very different when sorting is made prior to the high temperature composting phase carried out in the bioreactor 6.

In the same manner, after hygienization, handling of the compost will present substantially no health hazard for the consumers.

Also, the absence of crushing of the waste before feeding it to the bioreactor 6 through the hopper 7 reduces contamination by heavy metals.

In the compost maturation building 13, the crude compost from the bioreactor 6 is arranged into windrows such as 22 disposed into respective bays such as 20 separated by concrete walls such as 21. Of course, the number of windrows and bays, and the dimension of these windrows and bays can vary at will depending on the desired capacity.

The windrows 22 of compost are frequently turned for a maturation period usually situated between 30 and 60 days, i.e. until the compost is mature. More specifically, the windrows 22 are turned by an electromechanical compost turner (not shown). As non limitative examples:

- the windrows 22 are turned one windrow at a time by transferring the windrow 22 from one bay 20 to the other; or
- the windrows 22 are turned one windrow at a time and left in the same bay.

In selecting the method of turning the windrows, it should be kept in mind that more agitation is desirable to produce a more homogeneous compost. Upon turning the windrows 22, water is added to the compost to maintain therein a degree of humidity preferably situated between 40% and 60%.

Each windrow 22 is also aerated, and therefore oxygenated during the maturation period. For that purpose, at least one longitudinal trench such as 23 is formed in the concrete bottom of each bay 20. As a non limitative example, each trench 23 can be covered by wooden boards (not shown) forming slits therebetween and by supplying pressurized air in the trenches 23. Alternatively, the wooden boards could be replaced by perforated metal plates or by a bed of stones disposed in the trenches. A flow of air is then produced through the windrows 22 of crude compost to aerate these windrows and sustain maturation of the compost. Forced aeration of the windrows 22 of crude compost will also prevent the production of odors during maturation of the compost.

Also, a temperature of more than 50° C. is preferably maintained in the compost windrows 22.

The refined compost from the maturation building area 13 is conveyed through a conveyor belt 28 to a secondary refining area 26 located in building area 27, where it is processed through a large rotary screen, a feeder, and other secondary refining equipments to remove the small foreign particles of, for example, glass and/or plastic from the compost and thereby (a) produce a cleaner product usable as soil amendment and (b) achieve compost quality standard requirements. The compost 29 is then stored in another adjacent building area 30 of the compost facility and is ready for shipping by trucks such as 31 and for being used by consumers.

To control the odors, all the building areas 9, 13, 27 30 and 35 of the composting facility are normally closed and maintained at a negative pressure by aspirating air containing odorous substances from the building areas. In the different building areas 9, 13, 27, 30 and 35, air is preferably pumped in the proximity of the ceiling.

Pumping of air containing odorous substances is conducted at two levels:

First level:

Air containing odorous substances is pumped, preferably in the proximity of the ceilings of building areas 9, 27 and 35 through, as a non limitative example, pipes such as 32 and 33 and air pumps such as 34 schematically illustrated in FIG. 1. Air from building areas 9, 27 and 35 can also be pumped from locations where the concentration of dust or other substances is higher. This pumped air is mainly injected in the trenches 23 of the maturation building area 13 to aerate the windrows 22 of compost. A portion of this pumped air can also be injected directly in the compost maturation building area 13.

In the same manner, air containing odorous substances is pumped, preferably in the proximity of the ceiling of building area 30, through, as a non limitative example, pipes such as 42 and 43 and air pumps such as 44 schematically illustrated in FIG. 1. Air from building areas 30 can also be pumped from locations where the concentration of dust or other substances is higher. This pumped air can be injected either in the trenches 23 of the maturation building area 13 to aerate the windrows 22 of compost, or directly in the compost maturation building area 13.

It should be mentioned here that the compost maturation building area 13 serves as settlement chamber of the air pumped from the building areas 9, 27, 30 and 35 before, as will be seen in the foregoing description, this air is supplied to a biofilter 52 to thereby prevent clogging of this biofilter.

Figure 3:
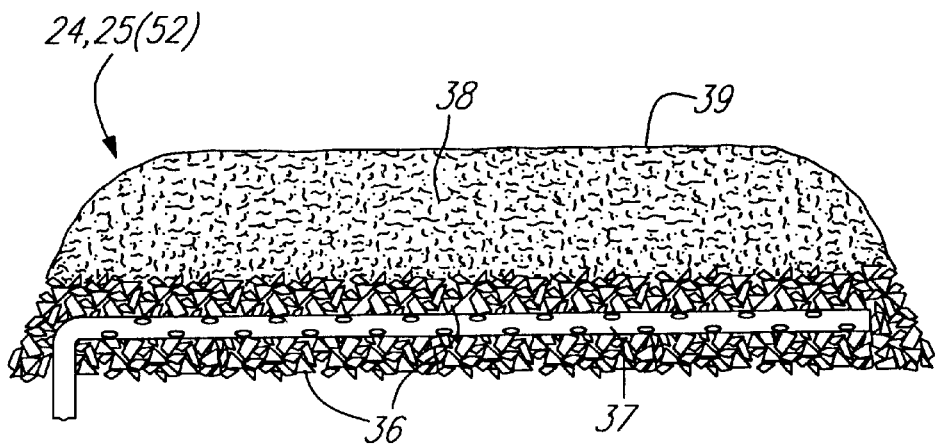
FIG. 3 is a cross sectional view of a biofilter used in the composting installation of FIG. 1.

Second level:

Finally, air containing odorous substances is pumped, preferably in the proximity of the ceiling of the compost maturation building area 13, through, as a non limitative example, pipes such as 45 and 46 and air pumps such as 47. This pumped air is injected uniformly throughout the volume of the biofilter 52. For that purpose, the biofilter 52 is formed with a rock bed base 36 (FIG. 3). A reasonable thickness of the rock bed base 36 is 3 feet; it is however within the scope of the present invention to provide a rock bed base 36 having a different thickness. Bed base 36 consists of an homogeneous mix of clean river stones or equivalent product. A network of perforated lines such as 37 are embedded in and runs through the rock bed base 36. The pumped air from the compost maturation building area 13 is supplied to the network of perforated lines 37 to distribute the air containing odorous substances uniformly into the biofilter 52.

The biofilter 52 also comprises a bed of filtering medium 38 on the top of the rock bed base 36. A reasonable thickness for the bed of filtering medium is 4 feet; however it is within the scope of the present invention to use a different thickness of filtering medium. Also, the filtering medium advantageously consists of an homogeneous mixture of the following constituents in the following volumetric proportions:

| | |
|---|---|
| wood chips | 4 ± 20% |
| bark particles | 4 ± 20% |
| organic matter | 1 ± 20% |

The organic matter can be selected from the group consisting of compost, peat moss, other organic matter having similar properties, and a combination thereof. Accordingly, the filtering medium 38 is an organic mixture conducting an entirely natural organic slow filtration process. A large quantity of air flows through the filtering medium of the biofilter 52 to allow the microorganisms (initially present in the organic matter such as compost, peat moss or a combination thereof) to eliminate the odorous substances produced by the composting of the organic compostable waste fraction. For a good efficiency of the biofilter 52, the degree of humidity is maintained between 40% and 60%; a film of water then surrounds the particles of the filtering medium to promote growing of the microorganisms capable of extracting the odorous substances and, therefore, the odors from the air before releasing the filtered air to the atmosphere. The biofilter 52 is so efficient that the quantity of most of the odorous substances released at the outlet of the biofilter 52 is so small that they are practically undetectable.

As illustrated, the biofilter 52 is a multi-cell biofilter; two biofilter cells 24 and 25 being illustrated in FIG. 1. Of course, a number of biofilter cells larger than 2 could be used. The number and size of the biofilter cells are selected to meet with the capacity requirements of the intended application. The cells normally work in parallel but each cell can be isolated for repair while the other(s) remain in operation for odor control during the maintenance period. Also, the biofilter 52 is designed so that each molecule of air remains for 1 minute in the filtering medium 38.

Control of the composting process and installation is carried out from the air-conditioned central control room 8 overlooking the waste pit 4 and waste receiving area 2. Programmable logic controllers and automated video equipments (not shown) allow the operator full control over the entire composting process. As few as three employees can operate the entire whole composting installation.

The composting process according to the invention is very flexible. It easily adapts to change of the habits of the consumers as well as to the type of waste collection, for example selective, dry and/or humid. Of course, the quality of the produced compost is maximized when the process is preceded by a selective waste collection. Also, it provides for addition of:

liquid or solid additives to accelerate the composting process or characterize the produced compost; and/or other substances such as green residues, paper manufacturing residues and/or food industry residues.

The process according to the present invention can further process sewage sludge from municipal water treatment plants.

The composting process and installation according to the present invention can recycle a proportion as high as 70% of the contents of the average domestic green garbage bag, turning it into compost and recoverable materials such as plastics and metals. When combined with curbside selective collection, this process can reduce the proportion of waste destined for landfills to less than 30%.

As well known to those of ordinary skill in the art, compost has the following benefits:

as a soil amendment:
  a) is a rich organic material that regenerates poor soil;
  b) increases the content of organic matter and the retention capacity for water and soils;
  c) regenerates the microflora of soil in conjunction with fertilizers; and
  d) reduces the need for fertilizers as much as 50%, and lowers irrigation, fertilizer and pesticide costs;

as a preventive agent against pollution:
  a) prevents dispersion of pollution; and
  b) prevent erosion and loss of organic matter along river banks, roads, parks, playground and golf courses; and as a remedy to pollution:
  a) absorbs odor and degrades volatile organic compounds;
  b) immobilizes heavy metals and avoids contamination of the food chain; and
  c) degrades or eliminates wood preservatives, petroleum products, pesticides and hydrocarbon chlorides that are contained in contaminated soils.

Accordingly the waste composting process and installation according to the present invention convert waste to a useful product having a variety of possible markets.

Although the present invention has been described hereinabove by way of a preferred embodiment thereof, this embodiment can be modified at will, within the scope of the appended claims, without departing from the spirit and nature of the subject invention.

What is claimed is:

1. A process for aerobically composting at least one member selected from the group consisting of household, commercial and industrial waste containing organic matter and noncompostable waste material, comprising the steps of:

receiving said waste in a closed waste-receiving building area including a waste pit, and accumulating said different types of waste in the waste pit;

installing in a bioreactor building area a single-compartment horizontal tubular bioreactor having a longitudinal and a horizontal rotation axis, first and second ends, a waste supply inlet at the first end of the bioreactor, a material-delivering outlet at the second end of the bioreactor, and an inner microorganism-retaining, nongrinding waste-delacerating corrugated surface;

selectively feeding, by a remotely operated overhead crane and grapple assembly installed between the waste pit and the waste supply inlet of the bioreactor, said waste, including said organic matter and noncompostable waste material, from the waste pit to the waste supply inlet of the bioreactor without breaking down said waste;

rotating the bioreactor about said longitudinal and horizontal rotation axis to convert the organic matter into a crude compost;

delacerating the waste processed in the bioreactor without grinding said waste during rotation of the bioreactor and by the inner microorganism-retaining, nongrinding waste-delacerating corrugated surface;

exposing the organic matter of the waste processed in the bioreactor during rotation of the bioreactor to microorganisms retained on said inner microorganism-retaining, nongrinding waste-delacerating corrugated surface to promote aerobic composting of said organic matter;

humidifying and oxygenating the organic matter of the waste processed in the bioreactor in view of maintaining in the bioreactor optimal conditions of aerobic composting of said organic matter;

supplying noncompostable waste material and crude compost from the material-delivering outlet of the bioreactor to a primary refining area and, in said primary refining area, separating the noncompostable waste material from the crude compost, wherein separation of the noncompostable waste material from the crude compost is facilitated since the waste has not been ground; and maturing the crude compost from the primary refining area in a compost-maturation building area.

2. A waste composting process as defined in claim 1, further comprising:

creating a negative pressure in the waste-receiving, bioreactor and compost-maturation building areas by aspirating air from said waste-receiving, bioreactor and compost-maturation building areas;

supplying air aspirated from the waste-receiving, bioreactor and compost-maturation building areas to a biofilter;

filtering, by means of the biofilter, odorous substances from the air flowing through the biofilter; and releasing the air from the biofilter to the atmosphere.

3. A waste composting process as recited in claim 2, wherein supplying air to the biofilter comprises the steps of:

supplying in the compost-maturation building area the air aspirated from the waste-receiving and bioreactor building areas; and feeding the biofilter with the air aspirated from the compost-maturation building area.

4. A waste composting process as recited in claim 3, wherein supplying in the compost-maturation building area the air aspirated from the waste-receiving and bioreactor building areas comprises injecting a part of said aspirated air in the compost maturing in the compost-maturation building area.

5. A waste composting process as recited in claim 1, further comprising sorting recyclable and reusable material from the separated noncompostable waste material in a material-sorting area.

6. A waste composting process as defined in claim 1, wherein:
humidifying the organic matter includes supplying liquid to the bioreactor to humidify the waste; and
oxygenating the organic matter includes supplying forced air in the bioreactor to oxygenate the humid waste;
to thereby control the degree of humidity of the waste and create optimal aerobic conditions of growth and metabolic activity of desired microorganisms.

7. A waste composting process as defined in claim 1, further comprising secondarily refining the matured compost from the compost-maturation building area in a secondary refining area.

8. A waste composting process as recited in claim 1, further comprising eliminating from the matured compost from the compost-maturation building area small foreign particles.

9. A waste composting process as defined in claim 1, wherein selectively feeding said waste from the waste pit to the waste supply inlet of the bioreactor comprises:
diversifying the types of waste supplied to the bioreactor to optimize operation of said bioreactor; and
preventing direct contact between workers and the waste.

10. A waste composting process as recited in claim 1, further comprising:
setting a time of residence of the organic matter in the bioreactor to increase the temperature of the organic matter to a value located between 55° C. and 65° C. to perform hygienization of the organic matter and to convert said organic matter into crude compost; and
maturing the crude compost by maintaining in the crude compost a degree of humidity situated between 40% and 60% and a temperature higher than 50° C. during a time period located between 30 and 60 days.

11. A process as defined in claim 1, further comprising the step of:
providing the inner corrugated surface of the bioreactor with a plurality of picks to tear plastic bags and break down large waste particles.

12. An installation for aerobically composting at least one member selected from the group consisting of household, commercial and industrial waste containing organic matter and noncompostable waste material, comprising:
a closed waste-receiving building area having a waste pit to receive and accumulate different types of waste;
a bioreactor building area;
a single-compartment horizontal tubular rotative bioreactor located in the bioreactor building area to convert the organic matter to a crude compost, wherein the bioreactor includes:
a longitudinal and a horizontal rotation axis;
first and second ends;
a waste supply inlet at said first end of the bioreactor;
a material-delivering outlet at said second end of the bioreactor;
organic matter humidifying and oxygenating equipment operated, during rotation of the bioreactor, to maintain in said bioreactor optimal conditions of aerobic composting of the organic matter of the waste processed in said bioreactor; and
an inner microorganism-retaining, nongrinding waste-delacerating corrugated surface on which, during rotation of the bioreactor, the waste is delacerated without being ground and the organic matter of the waste is exposed to the retained microorganisms;
a waste supply system for selectively supplying said waste, including said organic matter and noncompostable waste material, from the waste pit to the bioreactor without breaking down the waste, said waste supply system having:
a bioreactor-feeding hopper connected to the waste supply inlet of the bioreactor;
a remotely operated overhead crane and grapple assembly located between the waste pit and the bioreactor-feeding hopper and through which said different types of waste from the waste pit are selectively supplied to the waste-feeding hopper and then to the bioreactor through said waste-feeding hopper and waste supply inlet;
a primary refining area;
a separator system located in the primary refining area to be supplied with noncompostable waste material and crude compost from the material-delivering outlet of the bioreactor, said separator system including a noncompostable-waste-material/crude-compost separating device, wherein separation of the noncompostable waste material from the crude compost is facilitated since the waste has not been ground;
a compost-maturation building area; and
a compost-maturation system located in the compost-maturation building area to be supplied with crude compost from the separator system.

13. A waste composting installation as recited in claim 12, further comprising:
a biofilter;
an air handling system having air-aspirating inlets located in the waste-receiving, bioreactor and compost-maturation building areas, and air-blowing outlets opening in the biofilter, whereby air is aspirated by the air handling system through the inlets so that a negative pressure is maintained in said waste-receiving, bioreactor and compost-maturation building areas and forced air is distributed through the outlets to the biofilter whereby odorous substances are filtered within the biofilter before releasing air to the atmosphere.

14. A waste composting installation as recited in claim 13, in which:
said biofilter comprises an air distributing base network including the air-blowing outlets of the air handling system;
said biofilter further comprises a bed of filtering medium disposed on the top of the air distributing base network; and
said filtering medium includes an homogeneous mixture of wood chips, bark particles and compost material maintained at a predetermined degree of humidity.

15. A waste composting installation as recited in claim 14, wherein the volumetric proportions of the filtering medium are as follows:

| | |
|---|---|
| wood chips | 4 ± 20% |
| bark particles | 4 ± 20% |
| compost material | 1 ± 20% |

16. A waste composting installation as recited in claim 13, wherein the air handling system comprises air-blowing outlets opening in the compost maturing in the compost-maturation building area to oxygenate the compost and control compost temperature.

17. A waste composting installation as recited in claim 11, further comprising a compost turning, agitating and humidifying system ensuring homogeneity and humidity of the compost maturing in the compost-maturation building area and eliminating preferential air paths.

18. A waste composting installation as recited in claim 13, further comprising a material-sorting area in which recyclable and reusable material is sorted from the separated noncompostable waste material, wherein the air handling system comprises air-aspirating inlets located in said waste-receiving building area, bioreactor building area, primary refining area, compost-maturation building area, secondary refining area, and material-sorting area to maintain a negative pressure in said waste-receiving building area, bioreactor building area, primary refining area, compost-maturation building area, secondary refining area, and material-sorting area.

19. A waste composting installation as recited in claim 12, wherein the organic matter humidifying and oxygenating system comprises a liquid supply sub-system at the waste supply inlet of the bioreactor and an air forced sub-system in communication with the inside of the bioreactor, whereby liquid is supplied to the bioreactor to humidify the waste and forced air is supplied to the bioreactor to oxygenate the humid waste, control the degree of humidity of the waste, and create optimal aerobic conditions of growth and metabolic activity of desired microorganisms.

20. An installation for composting as defined in claim 12, further comprising a control room for the overhead crane and grapple assembly, wherein the control room is remote from the overhead crane and grapple assembly, is isolated from the waste-receiving and bioreactor building areas and therefore allows an operator to control remotely operation of the overhead crane and grapple assembly without direct contact between the operator and the waste.

21. An installation as defined in claim 12, wherein the inner corrugated surface includes a plurality of picks to tear plastic bags and break down large waste particles.

* * * * *

UNITED STATES PATENT AND TRADEMARK OFFICE
CERTIFICATE OF CORRECTION

PATENT NO. : 6,337,203 B1  Page 1 of 1
DATED : January 8, 2002
INVENTOR(S) : Beaulieu It is certified that error appears in the above-identified patent and that said Letters Patent is hereby corrected as shown below:

<u>Title page,</u>
Item [45] and the Notice information should read:

-- [45] Date of Patent:   *Jan. 8, 2002

[*]   Notice:   This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days. --

Signed and Sealed this

Tenth Day of September, 2002

Attest:

Attesting Officer

JAMES E. ROGAN
*Director of the United States Patent and Trademark Office*